Aug. 21, 1934.  G. B. COUBROUGH  1,970,993
METHOD FOR CONDENSING VAPORS
Filed Dec. 1, 1930
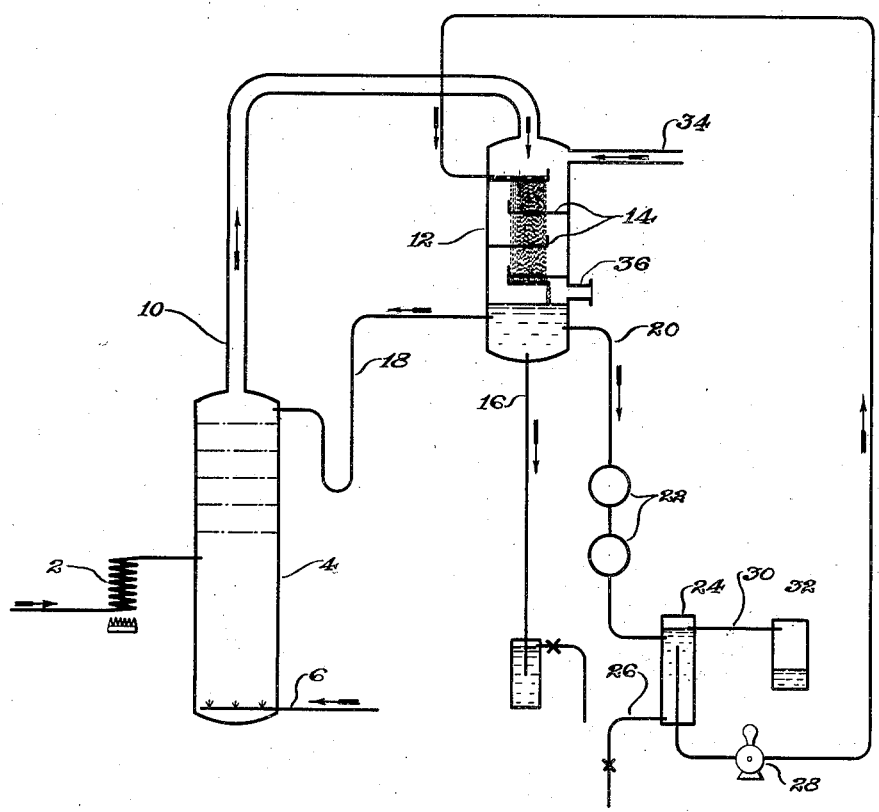
Witness
Paul F. Bryant
Inventor
George B. Coubrough
by Van Evenen Fish
Hildreth & Cary Attys.

Patented Aug. 21, 1934

1,970,993

UNITED STATES PATENT OFFICE 1,970,993

METHOD FOR CONDENSING VAPORS

George B. Coubrough, Long Beach, Calif., assignor, by mesne assignments, to The Lummus Company, a corporation of Delaware Application December 1, 1930, Serial No. 499,308

1 Claim. (Cl. 196—140)

The present invention relates to methods for condensing vapors and is more particularly concerned with the condensation of petroleum oils containing corrosive matter.

The object of the present invention is to provide a method for continuously and satisfactorily condensing corrosive vapors without necessity for frequent repairs. To this end, the present invention consists in the method hereinafter described and particularly defined in the claim.

The accompanying drawing is a diagram illustrating the preferred condensing apparatus embodied in a system for the distillation of petroleum oil.

In the illustrated embodiment of the invention, the crude oil heated in a pipe still 2 is introduced into the mediate point of a distilling and rectifying column 4, steam being introduced into the bottom of the column, as indicated at 6. The upper portion of the column comprises a plurality of decks over which reflux liquid is passed in countercurrent to the vapors to rectify the latter. The light vapors, which may be gasoline vapors, leave the top of the column through a vapor pipe 10 and are introduced into the top of a condensing column 12.

The condensing column 12 comprises a small tower having a plurality of staggered decks 14 so arranged that the vapors progress in a tortuous path from the top of the tower and between the decks to the bottom of the tower. The vapors are condensed by direct contact with a liquid which is sprayed onto the decks 14. The decks are perforated to permit a fine spray or rain of liquid to pass from deck to deck. The contact liquid consists of the oil condensate itself, a sufficient amount of which is continuously recirculated to effect complete condensation of the vapors. The condensate collects in the bottom of the column 12, the oil floating on the water. The water is withdrawn at 16, a portion of the oil is returned through the pipe 18 as reflux to the top of the column, and the remainder of the oil is continuously withdrawn through a pipe 20 and is passed through coolers 22 into a decanter 24. In the decanter 24, a further separation of water and oil is permitted, the water being withdrawn at 26 and a portion of the oil being circulated back to the condenser column 12 by a pump 28. A definite proportion of the oil is withdrawn as a product from the top of the decanter 24 through the pipe 30 and collected in a tank 32. The recirculated oil which is pumped into the column 12 acts as a condensing medium. The proportion of oil which is recirculated as the condensing medium is determined by the speed of the pump 28. The pump is operated at a sufficient speed to recirculate as much condensate as is necessary to effect practically complete condensation of the vapors.

Ammonia gas is introduced into the top of the condensing column 12 through the pipe 34. This gas which mixes with the vapors minimizes any tendency to corrosion. Because of the large space available for intimate mixture of the corrosive vapors with the ammonia, a practically complete neutralization may be effected.

Any uncondensable materials, such as the permanent gases, are exhausted through a vapor outlet 36.

Since the vapors contact with liquid in the substantially open condensing chamber, any corrosive substances which may remain do not contact with metal surfaces of sufficient area to produce any substantial corrosion. The trays 14 may be made of any non-corrodible material and at any event may be of sufficient thickness to withstand corrosion for a long period.

Having thus described the invention, what is claimed is:

The method of condensing corrosive vapor mixtures of steam and oil which consists in admitting the vapor mixture into the upper part of a contact chamber, continuously admitting a neutralizing agent into contact with the entering vapors, continuously passing through the chamber from top to bottom thereof a condensing liquid comprising previously condensed oil condensate in sufficient quantity to condense the steam and oil vapors, decanting the condensed oil from the water, and using a portion of the oil as the condensing medium.

GEORGE B. COUBROUGH.

CERTIFICATE OF CORRECTION.

Patent No. 1,970,993. August 21, 1934.

GEORGE B. COUBROUGH.

It is hereby certified that error appears in the printed specification of the above numbered patent requiring correction as follows: Line 91, the claim, before "and" insert the words and comma discharging the water from the system,; and that the said Letters Patent should be read with this correction therein that the same may conform to the record of the case in the Patent Office.

Signed and sealed this 16th day of October, A. D. 1934.

(Seal)

Leslie Frazer
Acting Commissioner of Patents.